UNITED STATES PATENT OFFICE.

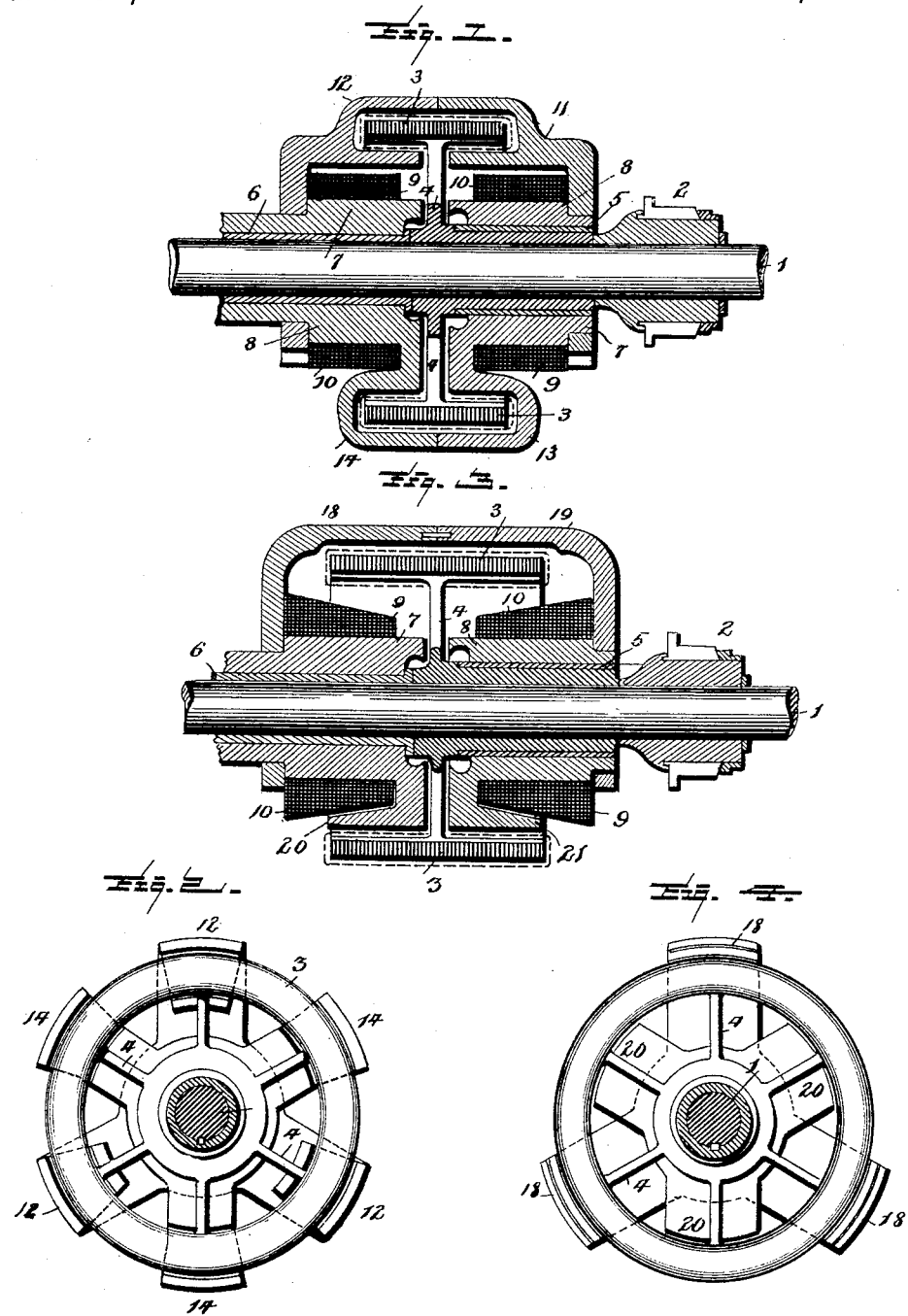

OLOF DAHL, OF PATERSON, NEW JERSEY, ASSIGNOR TO THE DAHL ELECTRIC COMPANY, OF NEW JERSEY.

ELECTRO-DYNAMIC MACHINE.

SPECIFICATION forming part of Letters Patent No. 499,099, dated June 6, 1893.

Original application filed October 21, 1890, Serial No. 368,863. Divided and this application filed April 22, 1893. Serial No. 471,418. (No model.)

*To all whom it may concern:*

Be it known that I, OLOF DAHL, a subject of the King of Sweden and Norway, at present residing in Paterson, State of New Jersey, have invented certain new and useful Improvements in Electro-Dynamo Machines, of which the following is a specification.

This application is a division of my application, Serial No. 368,863, filed by me October 21, 1890, in the United States Patent Office.

The primary object of my invention is to provide a type of electric motor that is suitable to be placed directly on the driving axle of such slow running machines as railway trucks, elevators, propellers, &c., without being too heavy or taking up too much space.

To this end the invention consists in the special arrangements of field magnets, field magnetic coils and armatures, hereinafter described and claimed.

In the drawings accompanying this specification Figure 1 is a longitudinal vertical section of a motor and its connections embodying my invention. Fig. 2 is an end view of the same motor as seen from the commutator end, with the commutator, brush holders and one of the field magnets removed. Fig. 3 is a longitudinal vertical section of a modified form of the motor. Fig. 4 is an end view of the motor last referred to, taken from the commutator end in the same way as in Fig. 2.

Like reference numerals indicate corresponding parts in all the figures.

In the drawings, referring now to the machine shown in Figs. 1 and 2, 1 represents the main or driving shaft, on which is placed a commutator 2 of the usual construction. The armature core 3 is fixed to the shaft 1 by means of the spider 4 the hub of which is fastened on the shaft. The armature may be of the open or closed circuit type, and the wires from the same are carried through the hub of the spider to the commutator in any ordinary or suitable manner.

On bushings 5 and 6 and placed on opposite sides of the spider 4 fit the magnet cores 7 and 8 which are concentric with the shaft; on them the exciting spools 9 and 10 are respectively wound.

To the magnet core 7 are connected pole pieces 12, 14, attached at opposite ends of the core so that the pieces 12 shall be of opposite polarity to the pieces 14. Similarly the magnet core 8 is provided with corresponding pole pieces 11, 13 of opposite polarity. The two field magnets not only are concentric with the driving shaft or axle, but as shown are symmetrically situated with reference to the armature. The two sets of pole pieces (of corresponding polarity) project toward each other and in fact abut so as to form consequent poles. They are presented to the armature alternately in positive and negative order, and in the arrangement shown in Figs. 1 and 2 they are so arranged as to envelop or embrace the armature or its periphery.

The machine shown in Figs. 3 and 4 differs from that shown in Figs. 1 and 2 in the formation of the pole pieces; in other respects the two are substantially the same, the pole pieces of the two field magnet cores of the same polarity being placed opposite to and extending toward each other and being presented to the armature in the same order—that is alternately positive and negative. But in Figs. 3 and 4 the pole pieces 18 and 19 of the two field magnet cores which have one polarity abut and are securely doweled or otherwise fastened together at their meeting ends, and are (as in Fig. 1) placed so as to embrace or cover part of the outside surface or periphery of the armature, while the pole pieces 20 and 21 of the other polarity are placed opposite to and so as to cover part of the interior surface of the armature ring—the arrangement in this last named respect differing from that illustrated in Figs. 1 and 2.

I have omitted representation of the commutator brushes, as being too well known to require illustration. I have also omitted representation of the supporting frame for the working parts, as forming no part of the present invention; this as well as the manner of mounting the motor in the frame will vary according to the use for which the motor is designed—whether as a stationary motor or for locomotive purposes.

While I have described my invention as embodied in a motor, yet it is obvious that machines for the generation of electric currents can be made of the same type.

In conclusion I state that I do not here claim broadly the combination in an electric generator or motor of a ring or annular armature, and a field magnet whose pole pieces of alternately opposite polarity are arranged, those of one polarity on the inside, and those of the other polarity on the outside, of the armature, this among other things being the subject of my aforesaid application, Serial No. 368,863, of October 21, 1890.

What I here claim, and desire to secure by Letters Patent, is—

1. In an electro-dynamo machine, the combination of a shaft; an armature affixed thereto; two field magnets concentric with the shaft and symmetrically situated with reference to the armature; magnetizing coils or windings on said field magnets also concentric with said shaft; pole pieces of one polarity extending from one end of the magnetizing coil of each magnet; and pole pieces of opposite polarity extending from the other end of the magnetizing coil of each magnet—the pole pieces being alternately of opposite polarity and being so arranged that those of one polarity in the one magnet shall extend toward and meet those of corresponding polarity of the other magnet, and shall be presented in this order to the armature.

2. In an electro-dynamo machine, the combination of a shaft; an armature affixed thereto; two field magnets concentric with the shaft and symmetrically situated with reference to the armature; magnetizing coils or windings on said field magnets also concentric with the shaft; two or more pole pieces of one polarity extending from one end of each magnet; and two or more pole pieces of opposite polarity extending from the other end of each magnet—the pole pieces of like polarity in the one magnet abutting against corresponding pole pieces of the other magnet, and embracing the exterior of the armature, to which they are presented in alternate order as regards polarity.

In testimony whereof I affix my signature in presence of two witnesses.

OLOF DAHL.

Witnesses:
J. M. CAMPBELL,
FRANK B. CASE.